United States Patent
Xu et al.

(10) Patent No.: US 12,062,750 B1
(45) Date of Patent: Aug. 13, 2024

(54) BATTERY CELL, METHOD AND DEVICE FOR MANUFACTURING THE SAME, BATTERY AND ELECTRICAL DEVICE

(71) Applicant: CONTEMPORARY AMPEREX TECHNOLOGY CO., LIMITED, Ningde (CN)

(72) Inventors: Hu Xu, Ningde (CN); Siying Huang, Ningde (CN); Fenggang Zhao, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/430,512

(22) Filed: Feb. 1, 2024

Related U.S. Application Data

(63) Continuation of application No. PCT/CN2021/133477, filed on Nov. 26, 2021.

(51) Int. Cl.
*H01M 50/559* (2021.01)
*H01M 10/04* (2006.01)
(Continued)

(52) U.S. Cl.
CPC ... *H01M 10/0431* (2013.01); *H01M 10/0409* (2013.01); *H01M 10/0422* (2013.01);
(Continued)

(58) Field of Classification Search
CPC .......... H01M 10/0431; H01M 50/107; H01M 50/559; H01M 50/538; H01M 50/545;
(Continued)

(56) References Cited

U.S. PATENT DOCUMENTS

2012/0015235 A1* 1/2012 Fuhr ................ H01M 50/147
429/158
2021/0328313 A1 10/2021 Wu et al.

FOREIGN PATENT DOCUMENTS

CN 102856514 A 1/2013
CN 112310574 A 2/2021
(Continued)

OTHER PUBLICATIONS

International Search Report for International Application No. PCT/CN2021/133477, dated Aug. 25, 2022.
(Continued)

*Primary Examiner* — Lingwen R Zeng
(74) *Attorney, Agent, or Firm* — Ladas & Parry LLP

(57) ABSTRACT

A battery cell includes: a casing; an end cap assembly including an end cap body and an electrode terminal located on the end cap body; and an electrode assembly arranged in the casing and including a first electrode sheet and a second electrode sheet with opposite polarities; the first electrode sheet includes a first main portion and a first electrode tab protruding from the first main portion, and the second electrode sheet includes a second main portion and a second electrode tab protruding from the second main portion; an end of the winding body includes a first conductive region and a second conductive region, the first electrode tab is led out from the first conductive region, the second electrode tab is led out from the second conductive region, and adjacent first conductive region and second conductive region are arranged to be spaced along a radial direction of the winding body.

17 Claims, 6 Drawing Sheets

(51) Int. Cl.
*H01M 50/107* (2021.01)
*H01M 50/152* (2021.01)
*H01M 50/179* (2021.01)
*H01M 50/538* (2021.01)
*H01M 50/545* (2021.01)
*H01M 50/566* (2021.01)

(52) U.S. Cl.
CPC ....... *H01M 50/107* (2021.01); *H01M 50/152* (2021.01); *H01M 50/538* (2021.01); *H01M 50/545* (2021.01); *H01M 50/559* (2021.01); *H01M 50/566* (2021.01); *H01M 2220/20* (2013.01)

(58) Field of Classification Search
CPC ............. H01M 50/152; H01M 50/566; H01M 10/0409; H01M 10/0422; H01M 2220/20
See application file for complete search history.

(56) References Cited

FOREIGN PATENT DOCUMENTS

| | | |
|---|---|---|
| CN | 113258224 A | 8/2021 |
| CN | 214254642 U | 9/2021 |

OTHER PUBLICATIONS

Written Opinion of International Search Authority for International Application No. PCT/CN2021/133477, dated Aug. 25, 2022.

\* cited by examiner

BATTERY CELL, METHOD AND DEVICE FOR MANUFACTURING THE SAME, BATTERY AND ELECTRICAL DEVICE

CROSS REFERENCE TO RELATED APPLICATION

This application is a continuation of International Patent Application No. PCT/CN2021/133477, filed on Nov. 26, 2021, the content of which is incorporated by reference in its entirety.

TECHNICAL FIELD

The present application relates to the field of battery technology, and more particularly to a battery cell, a method and a device for manufacturing the same, a battery, and an electrical device.

BACKGROUND

With the advantages of high energy density, high power density, multiple cycles, and long storage time, the lithium-ion batteries have become widely used in electric vehicles.

However, how to improve the performance of electric vehicle batteries has always been a challenge in the industry.

SUMMARY

An object of the present application is to improve the performance of a battery.

According to a first aspect of the present application, a battery cell is provided, and the battery cell includes:
a casing provided with an opening;
an end cap assembly configured for closing the opening, and including an end cap body
and an electrode terminal located on the end cap body; and
an electrode assembly arranged in the casing and including a first electrode sheet and a second electrode sheet with opposite polarities;
the first electrode sheet includes a first main portion and a first electrode tab protruding from the first main portion, and the second electrode sheet includes a second main portion and a second electrode tab protruding from the second main portion;
the first electrode sheet and the second electrode sheet are configured to be wound around a winding axis, such that the first main portion and the second main portion are laminated to form a winding body;
an end of the winding body includes a first conductive region and a second conductive region, the first electrode tab is led out from the first conductive region, the second electrode tab is led out from the second conductive region, and adjacent first conductive region and second conductive region are arranged to be spaced along a radial direction of the winding body;
the first electrode tab is electrically connected to the electrode terminal, and the second electrode tab is electrically connected to the end cap body.

In the embodiment, the first electrode tab and the second electrode tab are led out from a same end of the winding body, therefore, only one end of the electrode assembly needs to reserve electrical connection space, which eliminates the need to provide electrode terminals at both ends of the battery cell, the overall energy density of the battery cell is effectively improved. When the capacity of the battery cell is constant, the volume of the battery cell is reduced, such that the layout of the battery in the electrical device is easier.

Moreover, the battery cell is only provided with one electrode terminal, the first electrode tab is electrically connected to the electrode terminal and the second electrode tab is directly connected to the end cap body, which can simplify the structure and assembly process of the battery cell. By eliminating one electrode terminal, a larger space is left on the end cap body, the layout of the liquid injection and pressure relief components on the end cap body is easier. Further, by eliminating one electrode terminal, the ample space for arranging temperature collection components, junction components between battery cells, and various types of wires is left, which further beneficial to increase the cross-sectional area of the electrode terminal and increase the overcurrent capacity of the battery cell. This design has greater advantages when the area of the end cap body is small.

In addition, the first electrode tab and the second electrode tab are radially arranged and spaced apart, which is beneficial for increasing the extension size of the first electrode tab and the second electrode tab along the circumference of the winding body, and improving the connection strength between the electrode tabs and the winding body, such that the root portions of the electrode tabs have a good self-supporting effect. During the process of applying circumferential force to the electrode tabs to flatten, the wrinkling phenomenon of the electrode tabs is reduced, and the shape of the flattening area is stable. The electrical connection effect between the first electrode tab and the electrode terminal, as well as between the second electrode tab and the end cap body, are optimized, which ensures that the electrode assembly can reliably transmit power to the outside and improve the overcurrent capacity.

In some embodiments, the first conductive region is located radially inside the second conductive region.

In the embodiment, the first electrode tab is let out from a middle area of the winding body, such that the electrode terminal is located close to the middle area of the end cap body, and the surrounding areas are left for the layout of the liquid injection components and the pressure relief components; which leaves ample space for temperature collection components, junction components between battery cells, and various wires. The cross-sectional area of the electrode terminal is increased, and the overcurrent capacity of the battery cell is increased. Further, the first conductive region is located radially outside the second conductive region.

In some embodiments, the electrode terminal is provided with a first groove on a surface away from the electrode assembly, the first groove is recessed towards a direction close to the electrode assembly; a first welding portion is formed between a bottom surface of the first groove and a surface of the electrode terminal close to the electrode assembly, and the first electrode tab is welded to the first welding portion.

In the embodiment, the electrode terminal is provided with the first groove, the thickness of the electrode terminal in the welding area is reduced. The welding is directly performed from the outside of the electrode terminal after the end cap assembly is mounted on the casing, the assembly process is simplified, and the firmness of the welding is improved to reliably achieve the electrical connection between the electrode terminal and the first electrode tab.

In some embodiments, the end cap body is provided with a second groove on a surface away from the electrode assembly, and the second groove is recessed towards a direction close to the electrode assembly; a second welding portion is formed between a bottom surface of the second groove and a surface of the end cap body close to the electrode assembly, and the second electrode tab is welded to the second welding portion.

In the embodiment, the end cap body is provided with the second groove, the thickness of the end cap body in the welding area is reduced. The welding is directly performed from the outside of the end cap body after the end cap assembly is mounted on the casing, the assembly process is simplified, and the firmness of the welding is improved to reliably achieve the electrical connection between the end cap body and the second electrode tab.

In some embodiments, a plurality of second grooves are provided, and the plurality of second grooves are arranged to be spaced along a circumferential direction of the winding body.

In the embodiment, the plurality of second grooves are arranged and spaced in a circumferential direction on the end cap body, which not only improves the reliability of the electrical connection between the second electrode tab and the end cap body (for example, when using welding to achieve electrical connection, a plurality of welding positions can ensure welding strength and prevent the welding positions from loosening when the battery is subjected to vibration and impact during use), but also provides other components such as a liquid injection component and a pressure relief component between adjacent second grooves, to fully use the space on the end cap body.

In some embodiments, the battery cell further includes an adapter, and the first electrode tab is electrically connected to the electrode terminal by the adapter, and/or the second electrode tab is electrically connected to the end cap body by the adapter.

In the embodiment, the battery cell includes the adapter, the requirements for the positional relationship between the first electrode tab and the electrode terminal, as well as between the second electrode tab and the end cap body, are reduced, thereby the difficulty of the electrical connection process is reduced. Moreover, due to the fluffiness of the plurality of electrode tabs, the connection reliability by the adapter is easier to be improved to increase the overcurrent capacity of the inner and outer ring electrode tabs. For example, when using welding for electrical connection, the welding trajectory between the adapter and the electrode tabs is controllable, which can improve the firmness of welding. In addition, the damage to the electrode tabs or winding body during electrical connection is further avoided, for example, when welding is used, which can prevent welding energy from burning the electrode tabs, causing deformation of the winding body, or detachment of the coating layer on the first main portion and second main portion.

In some embodiments, the first electrode tab is wound at least one full turn, and/or the second electrode tab is wound at least one full turn.

In the embodiment, the electrode tabs continuously extend and wind for at least one full turn, therefore, the connection strength with the winding body in a circumferential direction is good, such that the root portions of the electrode tabs have a good self-supporting effect. During the process of applying circumferential force to the electrode tabs to flatten, the wrinkling phenomenon of the electrode tabs is avoided, and the shape of the flattening area is stable. The electrical connection effect between the first electrode tab and the electrode terminal, as well as between the second electrode tab and the end cap body, are optimized, which ensures that the electrode assembly can reliably transmit power to the outside and improve the overcurrent capacity. In addition, particles generated during electrode tabs welding are further less likely to fall between the first electrode sheet and second electrode sheet in the liquid conductive region in a circumferential direction, which can improve the reliability of electrode assembly and prevent short circuits or scratches on the electrode sheets.

In addition, a continuous first electrode tab is arranged on a portion of a winding length of the first main body, and a continuous second electrode tab is arranged on a portion of the winding length of the second main body, the overcurrent capacity of the first electrode tab and the second electrode tab are met, discrete electrode tabs on the entire winding length of the main bodies are not needed, which simplifies the die-cutting process of the electrode tabs. At the same time, when the first electrode sheet and the second electrode sheet are wound to form the winding body, there is no need for electrode tabs alignment, which simplifies the process and improve the production efficiency of electrode assembly.

In some embodiments, the first electrode tab is wound by a plurality of full turns on the first conductive region, and/or the second electrode tab is wound by a plurality of full turns on the second conductive region.

In the embodiment, the electrode tabs are wound by a plurality of full turns on the conductive regions, the bending parts of the adjacent two electrode tab layers overlap with each other in the electrode tabs after flattening, the supporting effect of the electrode tabs is further strengthened, which prevents the electrode tabs from flattening and wrinkling, stabilizes the shape of the bending parts, and the welding effect between the first electrode tab and the electrode terminal, as well as the second electrode tab and the end cap body, are optimized. Moreover, the welding area between the flattened electrode tabs and the electrode terminal or end cap body is increased, such that the welding between the first electrode tab and the electrode terminal, as well as between the second electrode tab and the end cap body are more secure, which ensures that the electrode assembly can reliably transmit power to the outside and improve the overcurrent capacity.

In some embodiments, the first electrode sheet is provided with a plurality of first electrode tabs spaced along a winding direction, and the plurality of first electrode tabs form at least one first electrode tab group; at least one first conductive region is provided, and the first electrode tab group is arranged corresponding to the first conductive region, the first electrode tab group is extended circumferentially along a portion of the winding body and includes the plurality of first electrode tabs laminated radially; and/or the second electrode sheet is provided with a plurality of second electrode tabs spaced along the winding direction, and the plurality of second electrode tabs form at least one second electrode tab group, at least one second conductive region is provided, and the second electrode tab group is arranged corresponding to the second conductive region, the second electrode tab group is extended circumferentially along a portion of the winding body and includes the plurality of second electrode tabs laminated radially.

In the embodiment, the leading method of the electrode tabs reduce the weight of the electrode assembly while ensure current transmission capacity, therefore the weight of the battery cell is reduced.

In some embodiments, an end of the winding body further includes at least one liquid guiding region, the liquid guiding region is located radially along the winding body between the adjacent first conductive region and second conductive region, and the liquid guiding region is configured for guiding an electrolyte to flow into an interior of the winding body.

In the embodiment, the liquid guiding region is located between the adjacent first conductive region and second conductive region, which can not only isolate the first electrode tab and second electrode tab in space and provide insulation, but also enable the electrolyte to infiltrate from the liquid guiding region into the interior of the winding body; the wetting performance of the electrode assembly is ensured and the liquid absorption effect is improved, such that the active substances on the first electrode tab and second electrode tab are fully reacted with the electrolyte during the charging and discharging process of the batter, so as to optimize the performance of battery cell.

In some embodiments, a plurality of liquid guiding regions are provided, the end of the winding body is provided with a plurality of first conductive regions arranged to be spaced along a radial direction of the winding body, and a liquid guiding region is arranged between adjacent first conductive regions; and/or the end of the winding body is provided with a plurality of second conductive regions arranged to be spaced along a radial direction of the winding body, and a liquid guiding region is arranged between adjacent second conductive regions.

In the embodiment, a plurality of first conductive regions and/or a plurality of second conductive regions are arranged to be spaced along a radial direction of the winding body, which can improve the wetting performance of the electrolyte while ensuring the overcurrent capacity of the electrode tabs. The electrolyte can enter the interior of the winding body simultaneously through the liquid guiding region between adjacent first conductive region and second conductive region, the liquid guiding region between adjacent first conductive regions, and the liquid guiding region between adjacent second conductive regions. Therefore, the distribution of the electrolyte along the radial direction inside the winding body is more uniform during the charging and discharging process of the battery, such that the active substances on the first electrode sheet and second electrode sheet are fully reacted with the electrolyte, so as to optimize the performance of battery cell.

In some embodiments, the electrode assembly further includes a diaphragm configured for separating the first electrode sheet from the second electrode sheet; the diaphragm, the first main portion, and the second main portion are wound to form the winding body; and a portion of the diaphragm located in the liquid guiding region extends beyond sides of the first main portion and the second main portion in an extension direction of the winding axis.

In the embodiment, the diaphragm in the liquid guiding region is widened, which allows the side of the diaphragm to extend outward between the first electrode sheet and second electrode sheet in the liquid guiding region, and immerses the side of the diaphragm in the electrolyte, therefore, the electrolyte is easier to be absorbed by the diaphragm under capillary action, the wetting performance of the electrode assembly is improved, and thereby the performance of the battery cell is improved.

In some embodiments, the battery cell further includes a first insulating member; at least a portion of the first insulating member is radially arranged between adjacent first conductive region and second conductive region along the winding body.

In the embodiment, the first electrode tab and the second electrode tab are isolated by the first insulating member, to prevent contact short circuits between the first electrode tab and second electrode tab due to vibration or impact, therefore the working reliability of the battery cell is improved.

According to a second aspect of the present application, a battery is provided, and the battery includes a battery cell of above embodiments and a box body, and the box body is configured for accommodating the battery cell.

According to a third aspect of the present application, an electrical device is provided, and the electrical device includes a battery of above embodiments and the battery is configured for supplying electrical energy to the electrical device.

According to a fourth aspect of the present application, a method for manufacturing a battery cell is provided, and the method includes:

a step of providing components: providing a casing, an end cap assembly, and a first electrode sheet and a second electrode sheet with opposite polarities; the casing is provided with an opening, the end cap assembly includes an end cap body and an electrode terminal located on the end cap body, the first electrode sheet includes a first main portion and a first electrode tab protruding from the first main portion, and the second electrode sheet includes a second main portion and a second electrode tab protruding from the second main portion;

a step of winding electrode sheets: winding the first electrode sheet and the second electrode sheet around a winding axis to overlap the first main portion and the second main portion and form a winding body, an end of the winding body includes a first conductive region and a second conductive region; leading out the first electrode tab from the first conductive region, and leading out the second electrode tab from the second conductive region, and adjacent first conductive region and second conductive region are arranged to be spaced along a radial direction of the winding body; and a step of mounting an end cap: closing the opening of the end cap assembly, electrically connecting the first electrode tab to the electrode terminal, and electrically connecting the second electrode tab to the end cap body.

According to a fifth aspect of the present application, a device for manufacturing a battery cell is provided, and the device includes:

a component providing equipment configured for providing a casing, an end cap assembly, and a first electrode sheet and a second electrode sheet with opposite polarities; the casing is provided with an opening, the end cap assembly includes an end cap body and an electrode terminal located on the end cap body, the first electrode sheet includes a first main portion and a first electrode tab protruding from the first main portion, and the second electrode sheet includes a second main portion and a second electrode tab protruding from the second main portion;

an electrode sheet providing equipment configured for winding the first electrode sheet and the second electrode sheet around a winding axis to overlap the first main portion and the second main portion and form a winding body, an end of the winding body includes a first conductive region and a second conductive region; leading out the first electrode tab from the first conductive region, and leading out the second electrode tab from the second conductive region, and adjacent first conductive region and second conductive region are arranged to be spaced along a radial direction of the winding body; and an end cap mounting equipment configured for closing the opening of the end cap assembly, electrically connecting the first electrode tab to the electrode terminal, and electrically connecting the second electrode tab to the end cap body.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
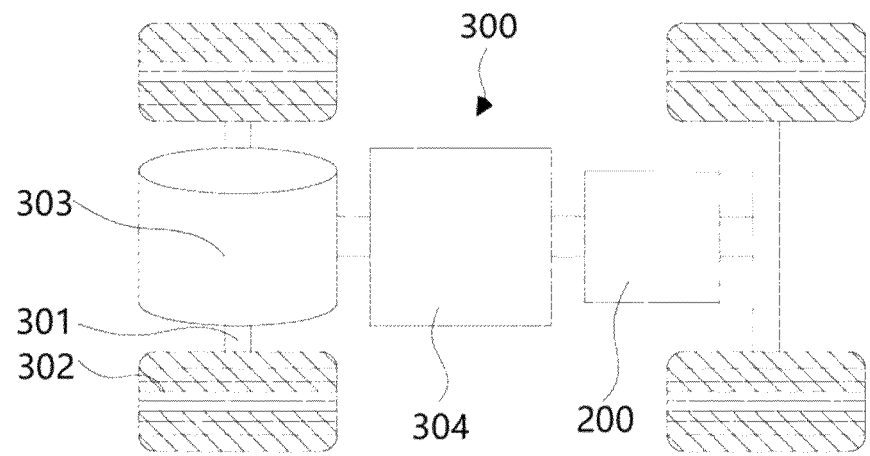
FIG. 1 is a structural schematic view of mounting a battery on a vehicle in some embodiments of the present application.

In the accompanying drawings, the features are not drawn to the actual scale.

The reference signs are listed:
10—electrode assembly;
1—first electrode sheet;
11—first main portion;
12—first electrode tab;
12'—first electrode tab group;
2—second electrode sheet;
21—second main portion;
22—second electrode tab;
22'—second electrode tab group;
3—diaphragm;
111—liquid guiding region;
112—first conductive region;
113—second conductive region;
100—battery cell;
101—casing;
1011—opening;
1012—recessed portion;
1013—bending part;
102—end cap assembly;
1021—end cap body;
1021'—second groove;
1021A—main board;
1021B—protruding portion;
1021C—through hole;
1022—electrode terminal;
1022'—first groove;
1022A—first terminal portion;
1022B—second terminal portion;
1022C—second insulating member;
1023—cap body;
1024—pressure relief component;
103—insulating film;
104—adapter;
1041—first connecting portion;
1042—second connecting portion;
105—first insulating ring;
106—second insulating ring;
107—first insulating member;
108—central tube;
109—sealing member;
200—battery;
201—box body;
201A—accommodating potion;
201B—first cap body;
201C—second cap body;
300—vehicle;
301—axle;
302—wheel;
30—motor;
304—controller;
400—manufacturing device;
410—component providing equipment;
420—electrode sheet winding equipment;
430—end cap mounting equipment;
S—winding body;
K—winding axis;
W1—first welding portion; and
W2—second welding portion.

DETAILED DESCRIPTION

The following embodiments of the present application are described in detail, and examples of the embodiment are illustrated in the accompanying drawings. The embodiment described below with reference to the accompanying drawings is illustrative and intended to illustrate the present application, but should not be considered as any limitation to the present application.

In the description of the present application, it should be noted that unless otherwise specified, "a plurality of" means two or more; The terms "up", "down", "left" "right", "inside", "outside" indicate the orientation or positional relationship only for the convenience of describing and simplifying the present application, rather than indicating or implying that the device or component referred to must have a specific orientation, be constructed and operated in a specific orientation, and therefore cannot be understood as a limitation on the present application.

In addition, the terms "first", "second", "third", etc. are only used to describe the purpose and cannot be understood as indicating or implying relative importance. 'Vertical' is not strictly vertical, but within the allowable range of error. "Parallel" is not strictly parallel, but within the allowable range of error. The directional words appearing in the following description are all the directions shown in the FIGS. and do not limit the specific structure of the present application.

In the description of the present application, it should also be noted that unless otherwise specified and limited, the terms "mounting", "connection", and "connecting" should be broadly understood, for example, it can be fixedly connected, detachably connected, or integratedly connected. it can be directly connected or indirectly connected through an intermediate medium. For those skilled in the art, the specific meanings of the above terms in the present application can be understood according to specific circumstances.

Referring to "embodiments" in the present application means that specific features, structures, or characteristics described in conjunction with the embodiments can be included in at least some embodiments of the present application. The phrase appearing in various positions in the specification does not necessarily refer to the same embodiment, nor is it an independent or alternative embodiment that is mutually exclusive with other embodiments. Those skilled in the art explicitly and implicitly understand that the embodiments described in the present application can be combined with other embodiments.

In the description of the embodiments of the present application, the term "a plurality of" refers to two or more (including two), similarly, "a plurality of groups" refers to two or more groups (including two groups), and "a plurality of pieces" refers to two or more pieces (including two pieces).

The present application adopts descriptions of orientations or positional relationships indicated by "up", "down", "top", "bottom", "front", "back". "inside", and "outside", etc., which are only for the convenience of describing the present application, and do not indicate or imply that the device referred to must have a specific orientation, be constructed and operated in a specific orientation. Therefore, it cannot be understood as a limitation on the scope of protection of the present application.

The battery cell can include a lithium-ion secondary battery, a lithium-ion primary battery, a lithium-sulfur battery, a sodium lithium-ion battery, a sodium ion battery, or a magnesium ion battery, etc., which is not limited here in embodiments of the present application. The battery cell is in a cylindrical shape, a flat shape, a rectangular shape, or other shapes, and which is not limited here in embodiments of the present application. The battery cell is generally divided into three types by packaging: a cylindrical battery cell, a square battery cells, and a soft package battery cell; which is not limited here in embodiments of the present application.

Currently, the battery cell generally includes a casing and an electrode assembly contained within the casing, and the casing is filled with electrolytes. The electrode assembly is mainly formed by stacking or winding the first electrode sheet and second electrode sheet with opposite polarities, and usually provided with a diaphragm arranged between the first electrode sheet and second electrode sheet. The parts of the first electrode sheet and second electrode sheet coated with active substances form the main portion of the electrode assembly, while the parts of the first electrode sheet and second electrode sheet that are not coated with active substances respectively form the first electrode tab and second electrode tab. In a lithium-ion battery, the first electrode sheet is a positive electrode sheet, including a positive current collector and a positive active substance layer arranged on both sides of the positive current collector; the material of the positive current collector is an aluminum, and the positive active substance is a lithium cobalt oxide, a lithium iron phosphate, a ternary lithium, or a lithium manganese oxide, etc. The second electrode sheet is a negative electrode sheet, including a negative current collector and a negative active substance layer arranged on both sides of the negative current collector; the material of the negative current collector is a copper, and the negative active substance is a graphite or a silicon, etc. The first electrode tab and second electrode tab are located at one end of the main body together or at both ends of the main body respectively. The positive and negative active substances react with the electrolyte during the charging and discharging process of the battery cell, and the electrode tabs are connected to the terminals to form a current circuit.

Currently, the battery cell is generally provided with a first electrode terminal and a second electrode terminal with opposite polarities, which are used to connect to the electrical circuit for power supply. The first electrode tab is electrically connected to the first electrode terminal, and the second electrode tab is electrically connected to the second electrode terminal. For example, for a cylindrical battery cell, due to the small end area of the battery cell, the second electrode tab and the second electrode terminal are respectively located at both ends of the battery cell. Correspondingly, the first electrode tab and the second electrode tab are respectively led out from both ends of the electrode assembly. However, the electrode tab and electrode terminal at each end are occupied a certain amount of space for electrical connection, which requires more space to be consumed in the height direction of the battery cell, such that the overall volume of the battery cell is increased, and the overall energy density of the battery cell is affected.

In order to improve the energy density of the battery cell, the first electrode terminal and the second electrode terminal are provided on a same end of the battery cell, and correspondingly, the first electrode tab and the second electrode tab are led out from a same end of the electrode assembly. However, such arrangement has two following problems:

1. Spatial layout problem: both two electrode terminals are arranged on the end cap causing that the layout on the end cap is crowded, and the insulation problem of both electrode terminals needs to be considered. In addition, the end cap further needs to be provided with liquid injection holes, pressure relief components, temperature collection components, junction components between battery cells, and various types of wires. The space layout is difficult to be carried out when the end cap area is smaller.

2. Insulation problem: a reliably insulating is needed when the first electrode terminal and the second electrode terminal are located at the same end of the battery cell, and the first electrode tab and the second electrode tab led out from the same end of the electrode assembly also need to consider insulating when being led out to improve the reliability of the battery cell during operating.

Based on the discovery of the above problems, the present application has improved the way the battery cell output electricity by increasing the energy density of the battery cell and improving the spatial layout on the end cap.

The end cap assembly includes an end cap body and an electrode terminal, and the electrode terminal is insulated and connected to the end cap body; the end of the winding body of the electrode assembly includes a first conductive region and a second conductive region. The first electrode tab is led out from the first conductive region, and the second electrode tab is led out from the second conductive region. Adjacent first and second conductive regions are arranged to be spaced along a radial direction of the winding body; the first electrode tab is electrically connected to the electrode terminal, and the second electrode tab is electrically connected to the end cap body. This type of battery cell can improve the overall energy density and simplify the structure and assembly process of the battery cell by eliminating one electrode terminal, which also leaves a large space on the end cap body, and leaves ample it space for the arrangement of various components on the end cap.

The battery cell of the embodiment of the present application is applicable to a battery and an electrical device using the battery.

The electric device is a mobile phone, a portable device, a laptop, a storage battery cart, an electric vehicle, a ship, a spacecraft, an electric toy, or an electric tool, etc., for example, the spacecraft includes an aircraft, a rocket, a space shuttle, and a spaceship, etc., and the electric toy includes fixed or mobile electric toys, such as a game console, an electric car toy, an electric ship toy, and an electric aircraft toy, etc., the electric tool includes a metal cutting electric tool, a grinding electric tool, an assembly electric tool, and a railway electric tool, such as an electric drill, an electric grinder, an electric wrench, an electric screwdriver, an electric hammer, an impact drill, a concrete vibrator, and an electric planer.

As shown in FIG. 1, the electrical device is a vehicle 300, such as a new energy vehicle, which can be a pure electric vehicle, a hybrid electric vehicle, or an extended range vehicle, etc. Alternatively, the electrical device is also a drone or a ship, etc. In the embodiment, the vehicle 300 includes an axle 301, wheels 302 connected to the axle 301, a motor 303, a controller 304, and a battery 200. The motor 303 is used to drive the axle 301 to rotate, the controller 304 is used to control the motor 303 to operate, and the battery 200 is mounted at a bottom, a head, or a tail of vehicle 300 to provide electric energy for the operation of motor 303 and other components in the vehicle.

Figure 2:
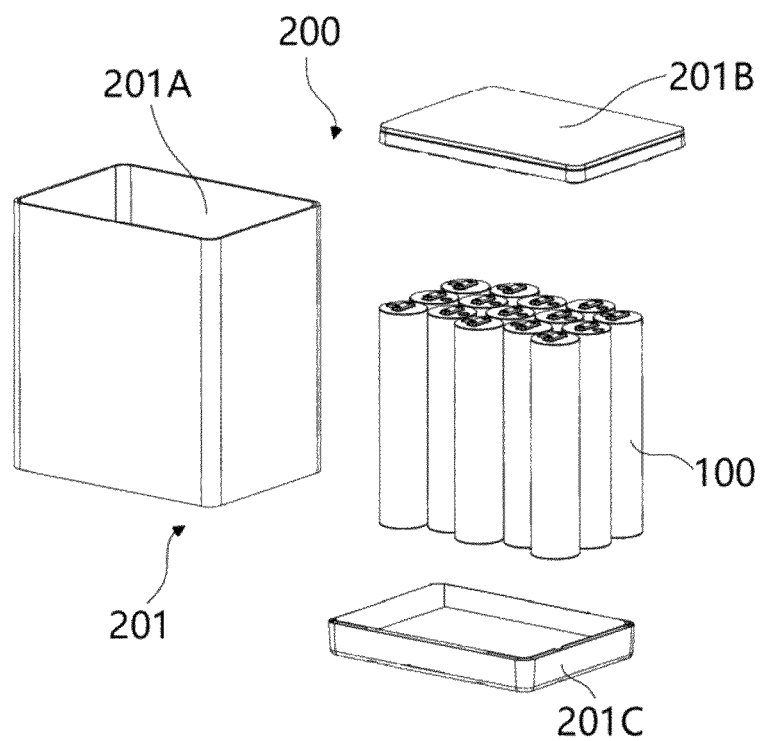
FIG. 2 is an exploded view of a battery in some embodiments of the present application.

As shown in FIG. 2, the battery 200 includes a box body 201 and a battery cell 100. In the battery 200, one or more battery cells 100 are provided. When a plurality of battery cells 100 are provided, the plurality of battery cells 100 are connected in series, in parallel, or in hybrid, where connected in hybrid refers to a combination of connected in series and connected in parallel of the plurality of battery cells 100. The plurality of battery cells 100 are first connected in series, in parallel, or in hybrid to form a battery module, and a plurality of battery modules are then connected in series, in parallel, or in hybrid to form an integral whole accommodated in the box body 201. Alternatively, all battery cells 100 are directly connected in series, in parallel, or in hybrid together, and then the integral whole composed of all battery cells 100 are then accommodated in the box body 201.

The interior of the box body 201 is hollow, and the box body 201 is used to accommodate one or more battery cells 100. Depending on the shape, quantity, assembly method, and other requirements of the contained battery cells 100, the box body 201 has different shapes and sizes. For example, the box body 201 includes: a accommodating portion 201A, a first cap body 201B, and a second cap body 201C. Both ends of the accommodating portion 201A are respectively provided with an opening, and the first cap body 201B and the second cap body 201C are respectively used to close the openings at both ends of the accommodating portion 201A. According to the arrangement of the plurality of battery cells 100 in FIG. 2, the accommodating portion 201A is in a rectangular cylindrical structure.

The battery cell 100 is, for example, a lithium-ion secondary battery, a lithium-ion primary battery, a lithium-sulfur battery, a sodium lithium-ion battery, or a magnesium ion battery, etc.

Figure 3:
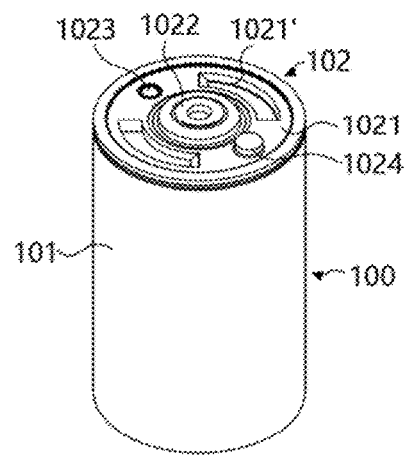
FIG. 3 is a structural schematic view of a battery cell in some embodiments of the present application.
Figure 4:
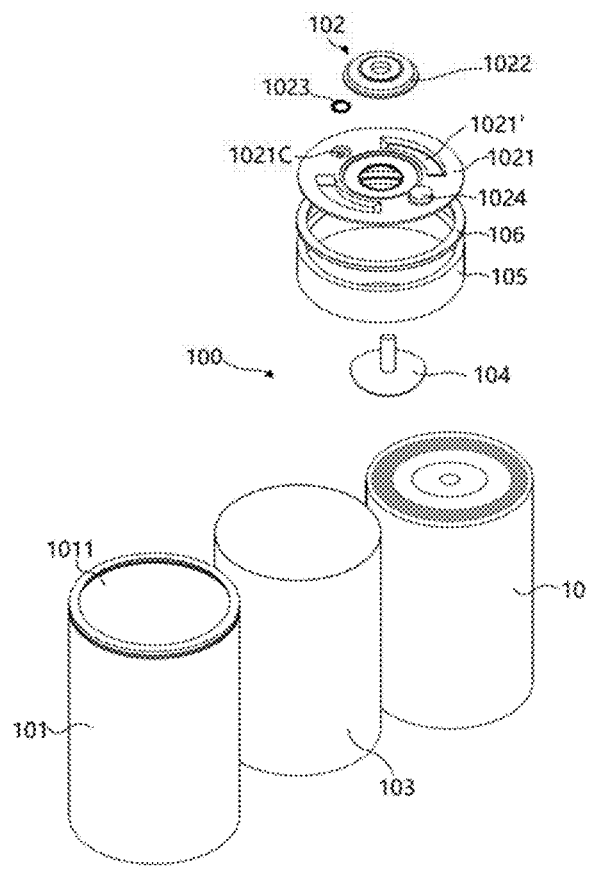
FIG. 4 is an exploded view of a battery cell in some embodiments of the present application.

In some embodiments, as shown in FIGS. 3 and 4, the battery cell 100 includes a casing 101, an end cap assembly 102, and an electrode assembly 10.

The casing 101 is provided with an opening 1011, and the end cap assembly 102 is used to close the opening 1011. The end cap assembly 102 includes n end cap body 1021 and an electrode terminal 1022 that is insulated and connected to the end cap body 1021.

Figure 5:
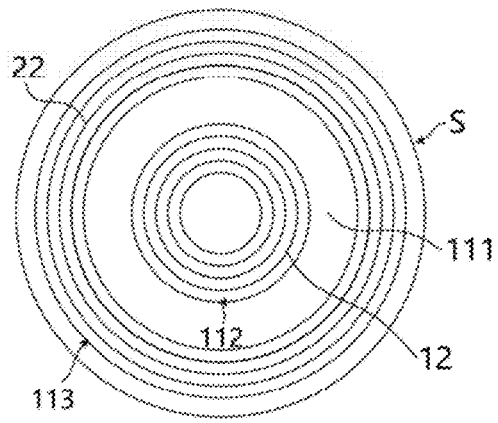
FIG. 5 is a schematic view of an end structure in some embodiments of an electrode assembly.
Figure 6:
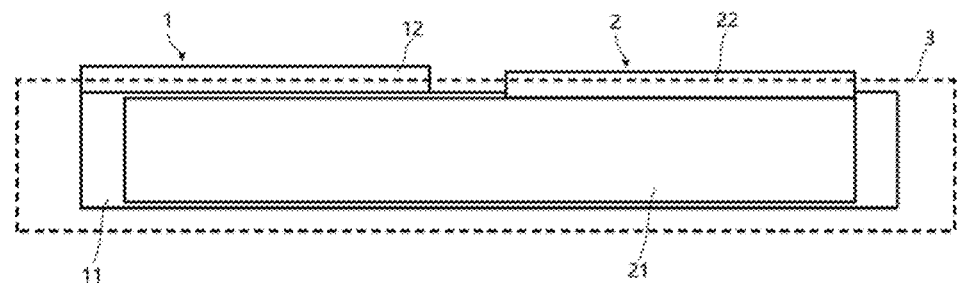
FIG. 6 is an expanded view of the electrode assembly shown in FIG. 5.

The electrode assembly 10 is arranged in the casing 101, as shown in FIGS. 5 and 6, The electrode assembly 10 includes a first electrode sheet 1 and a second electrode sheet 2 with opposite polarities, the first electrode sheet 1 includes a first main portion 11 and a first electrode tab 12 protruding from the first main portion 11, and the second electrode sheet 2 includes a second main portion 21 and a second electrode tab 22 protruding from the second main portion 21. The first electrode sheet 1 and the second electrode sheet 2 are configured to wind around a winding axis K, so that the first main portion 11 and the second main portion 21 are laminated to form a winding body S; an end of the winding body S includes a first conductive region 112 and a second conductive region 113, the first electrode tab 12 is led out from the first conductive region 112, and the second electrode tab 22 is led out from the second conductive region 113, and adjacent first conductive region 112 and and second conductive region 113 are arranged to be spaced along a radial direction of the winding body S. The first electrode tab 12 is electrically connected to the electrode terminal 1022, and the second electrode tab 22 is electrically connected to the end cap body 1021.

In the embodiment, the casing 101 is a hollow structure used to accommodate the electrode assembly 10, and the casing 101 is provided with the opening 1011, and the end cap body 1021 is used to cover the opening 1011. For a rectangular battery cell 100, the end cap body 1021 is a rectangular plate like structure. For a cylindrical battery cell 100, the end cap body 1021 is a disc-shaped structure.

The insulation connection of electrode terminal 1022 to the end cap body 1021 can be achieved in two forms, for example, the pan where the electrode terminal 1022 is connected to the end cap body 1021 is coated with an insulation layer, or the electrode terminal 1022 includes a conductive part and a second insulating member 1022C, the second insulating member 1022C is mounted between the conductive part and the end cap body 1021 to provide insulation. Due to the electrical connection between the first electrode tab 12 and the electrode terminal 1022, as well as between the second electrode tab 22 and the end cap body 1021, the end cap body 1021 acts as the electrode terminal, and the insulation connection between the electrode terminal 1022 and the end cap body 1021 can achieve the insulation of the positive and negative electrode terminals, the reliability of the battery cell 100 is improved. The term "electrical connection" here includes both direct and indirect connections.

The electrode assembly 10 is formed by winding the first electrode sheet 1 and the second electrode sheet 2 with opposite polarities. The shapes of the first electrode sheet 1 and the second electrode sheet 2 are basically the same and can be long strip structures. The formed winding body S is a cylinder, a flat body, a rectangular body, or other shapes. The first main portion 11 and the second main portion 21 are coated with different active substances, one first electrode tab 12 is provided, or a plurality of first electrode tabs 12 are arranged and spaced along the winding direction; and one second electrode tab 22 is provided, or a plurality of second electrode tabs 22 are arranged along the winding direction. For example, the first electrode sheet 1 is a positive electrode sheet, and the second electrode sheet 2 is a negative electrode sheet. Alternatively, the first electrode sheet 1 is a negative electrode sheet, and the second electrode sheet 2 is a positive electrode sheet.

At the end of the winding body S, adjacent first conductive region 112 and second conductive region 113 are arranged to be spaced along a radial direction of the winding body S, such that the first electrode tab 12 and the second electrode tab 22 are separated in space to avoid short circuits. Further, the radially spaced region can serve as a liquid guiding region due to the absence of electrode tabs, and the electrolyte can infiltrate into the interior of the winding body S from the liquid guiding region to fully react the electrolyte with the active substances on the first electrode sheet 1 and the second electrode sheet 2 during charging and discharging of the battery.

In order to achieve insulation of the electrode assembly 10, an insulating film 103 is arranged between the winding body S and the casing 101; an outer side of the second electrode tab 22 is sheathed with a first insulating ring 105, and a height of the first insulating ring 105 is consistent with a lead out length of the second electrode tab 22; a second insulating ring 106 is arranged between the end cap assembly 102 and the electrode assembly 10, and the second insulating ring 106 is made of plastic.

In the embodiment, the first electrode tab 12 and the second electrode tab 22 are led out from a same end of the winding body S, therefore, only one end of the electrode assembly 10 needs to reserve electrical connection space, which eliminates the need to provide electrode terminals 1022 at both ends of the battery cell 100, the overall energy density of the battery cell 100 is effectively improved. When the capacity of the battery cell 100 is constant, the volume of the battery cell 100 is reduced, such that the layout of the battery 200 in the electrical device is easier.

Moreover, the battery cell 100 is only provided with one electrode terminal 1022, the first electrode tab 12 is electrically connected to the electrode terminal 1022 and the second electrode tab 22 is directly connected to the end cap body 1021, which can simplify the structure and assembly process of the battery cell 100. By eliminating one electrode terminal, a larger space is left on the end cap body 1021, the layout of the liquid injection and pressure relief components on the end cap body 1021 is easier. Further, by eliminating one electrode terminal, the ample space for arranging temperature collection components, junction components between battery cells 100, and various types of wires is left, which further beneficial to increase the cross-sectional area of the electrode terminal 1022 and increase the overcurrent capacity of the battery cell 100. This design has greater advantages when the area of the end cap body 1021 is small.

In addition, the first electrode tab 12 and the second electrode tab 22 are radially arranged and spaced apart, which is beneficial for increasing the extension size of the first electrode tab 12 and the second electrode tab 22 along the circumference of the winding body S, and improving the connection strength between the electrode tabs and the winding body, such that the root portions of the electrode tabs have a good self-supporting effect. During the process of applying circumferential force to the electrode tabs to flatten, the wrinkling phenomenon of the electrode tabs is reduced, and the shape of the flattening area is stable. The electrical connection effect between the first electrode tab 12 and the electrode terminal 1022, as well as between the second electrode tab 22 and the end cap body 1021, are optimized, which ensures that the electrode assembly 10 can reliably transmit power to the outside and improve the overcurrent capacity. Further, the radial spacing area can not only isolate the first electrode tab 12 and the second electrode tab 22 in space for insulation, but also allow the electrolyte to infiltrate into the winding body S from the radial spacing area, ensuring the wetting performance of the electrode assembly 13 and improving the liquid absorption effect, so as to fully react with the active substances during the charging and discharging process of the battery, therefore the performance of the battery cell 100 is optimized.

In some embodiments, as shown in FIG. 6, the first conductive region 112 is located radially inside the second conductive region 113.

In the embodiment, the first electrode tab 12 is let out from a middle area of the winding body S, such that the electrode terminal 1022 is located close to the middle area of the end cap body 1021, and the surrounding areas are left for the layout of the liquid injection components and the pressure relief components; which leaves ample space for temperature collection components, junction components between battery cells, and various wires. The cross-sectional area of the electrode terminal 1022 is increased, and the overcurrent capacity of the battery cell 100 is increased. Further, the first conductive region 112 is located radially outside the second conductive region 113.

In some embodiments, an end of the winding body S further includes at least one liquid guiding region 111, and one of the liquid guiding regions 111 is located radially along the winding body S between adjacent first conductive region 112 and the second conductive region 113, and the liquid guiding region 111 is used to guide electrolyte into the interior of the winding body S.

The liquid guiding region 11I is not provided with an electrode tab, and a gap between the first electrode sheet 1 or the second electrode sheet 2 and the diaphragm 3 is connected to the outside of the electrode assembly 10, such that the electrolyte is easier to enter the gap between the first electrode sheet 1 or the second electrode sheet 2 and the diaphragm 3 and flow into the winding body S. The diaphragm 3 can also fully play a suction role, such that the electrolyte is fully reacted with the active substances on the first electrode sheet 1 and the second electrode sheet 2 during charging and discharging process of the battery.

In the embodiment, the liquid guiding region 11 is located between the adjacent first conductive region 112 and second conductive region 113, which can not only isolate the first electrode tab 12 and second electrode tab 22 in space and provide insulation, but also enable the electrolyte to infiltrate from the liquid guiding region 111 into the interior of the winding body S; the wetting performance of the electrode assembly 10 is ensured and the liquid absorption effect is improved, such that the active substances on the first electrode tab 12 and second electrode tab 22 are fully reacted with the electrolyte during the charging and discharging process of the batter, so as to optimize the performance of battery cell 100.

In some embodiments, a plurality of liquid guiding regions 111 are provided, the end of the winding body S is provided with a plurality of first conductive regions 112 arranged to be spaced along a radial direction of the winding body S, and a liquid guiding region 111 is arranged between adjacent first conductive regions 112; and/or the end of the winding body S is provided with a plurality of second conductive regions 113 arranged to be spaced along a radial direction of the winding body S, and a liquid guiding region 111 is arranged between adjacent second conductive regions 113.

In the embodiment, a plurality of first conductive regions 112 and/or a plurality of second conductive regions 113 are arranged to be spaced along a radial direction of the winding body S, which can improve the wetting performance of the electrolyte while ensuring the overcurrent capacity of the electrode tabs. The electrolyte can enter the interior of the winding body S simultaneously through the liquid guiding region 111 between adjacent first conductive region 112 and second conductive region 113, the liquid guiding region 11 between adjacent first conductive regions 112, and the liquid guiding region 111 between adjacent second conductive regions 113. Therefore, the distribution of the electrolyte along the radial direction inside the winding body S is more uniform during the charging and discharging process of the battery, such that the active substances on the first electrode sheet 1 and second electrode sheet 2 are fully reacted with the electrolyte, so as to optimize the performance of battery cell 100.

In some embodiments, as shown in FIG. 6, the electrode assembly 10 also includes a diaphragm 3 configured for separating the first electrode sheet 1 from the second electrode sheet 2. The diaphragm 3, the first main portion 11, and the second main portion 21 are wound to form the winding body S; and a portion of the diaphragm 3 located in the liquid guiding region 111 extends beyond sides of the first main portion 11 and the second main portion 21 in an extension direction of the winding axis K.

In the embodiment, the diaphragm 3 is a long strip structure in the unfolded state, and diaphragm 3 is made of PP (polypropylene) or PE (polyethylene) material, with micro-sized or nano-sized micropores inside for metal ions to pass through during the charging and discharging process of the battery.

In the embodiment, a portion of a side of the diaphragm 3 located in the liquid guide region 111 extends beyond sides of the first main portion 11 and the second main portion 21 in an extension direction of the winding axis K; or portions of two sides of the diaphragm 3 located in the liquid guide region 111 extend beyond sides of the first main portion 11 and the second main portion 21 in an extension direction of the winding axis K.

In the embodiment, the diaphragm 3 in the liquid guiding region 111 is widened, which allows the side of the diaphragm 3 to extend outward between the first electrode sheet 1 and second electrode sheet 2 in the liquid guiding region 111, and immerses the side of the diaphragm 3 in the electrolyte, therefore, the electrolyte is easier to be absorbed by the diaphragm 3 under capillary action, the wetting performance of the electrode assembly 10 is improved, and thereby the performance of the battery cell 100 is improved.

Figure 8:
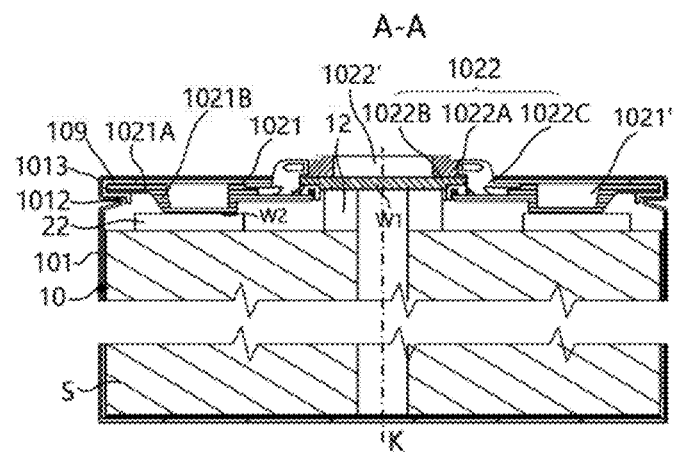
FIG. 8 is a cross-sectional view of a first embodiment of the battery cell along a line A-A shown in FIG. 7.

In some embodiments, as shown in FIG. 8, the electrode terminal 1022 is provided with a first groove 1022' on a surface away from the electrode assembly 10, the first groove 1022' is recessed towards a direction close to the electrode assembly 10; a first welding portion W1 is formed between a bottom surface of the first groove 1022' and a surface of the electrode terminal 1022 close to the electrode assembly 10, and the first electrode tab 12 is welded to the first welding portion W1.

In the embodiment, the shape and size of the first groove 1022' are provided according to the welding area. For example, the first electrode tab 12 and the electrode terminal 1022 are welded by a laser. The thickness of the first welding portion W1 should ensure that the welding energy can penetrate to achieve reliable fixation.

In the embodiment, the electrode terminal 1022 is provided with the first groove 1022', the thickness of the electrode terminal 1022 in the welding area is reduced. The welding is directly performed from the outside of the electrode terminal 1022 after the end cap assembly 102 is mounted on the casing 101, the assembly process is simplified, and the firmness of the welding is improved to reliably achieve the electrical connection between the electrode terminal 1022 and the first electrode tab 12.

Figure 7:
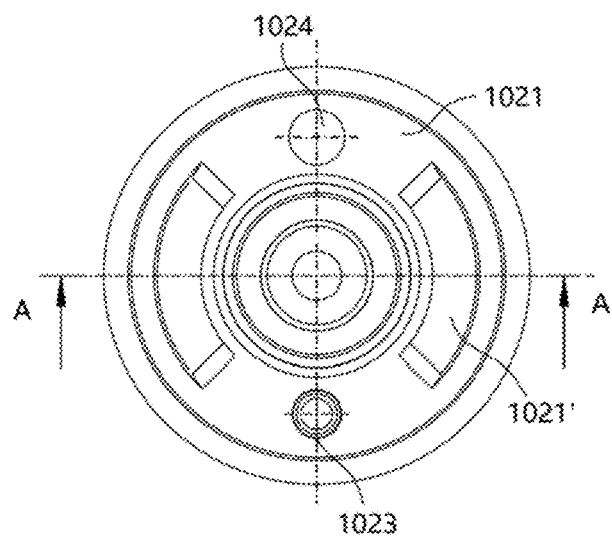
FIG. 7 is a top view of a battery cell in some embodiments of the present application.

In some embodiments, as shown in FIGS. 7 and 8, the end cap body 1021 is provided with a second groove 1021' on a surface away from the electrode assembly 10, and the second groove 1021' is radially located an outside of the electrode terminal 1022. The second electrode tab 22 is connected to the position corresponding to the second groove 1021' on the end cap body 1021.

In the embodiment, a second welding portion W2 is formed between a bottom surface of the second groove 1021' and a surface of the end cap body 1021 close to the electrode assembly 10, and the second electrode tab 12 is welded to the second welding portion W2. The shape and size of the second groove 1021' are provided according to the welding area. For example, the second electrode tab 22 and the end cap body 1021 are welded by a laser. The thickness of the second welding portion W2 should ensure that the welding energy can penetrate to achieve reliable fixation.

In the embodiment, the end cap body 1021 includes a main board 1021A and a protruding portion 1021B, the protruding portion 1021B is connected to one side of the main board 1021A close to the electrode assembly 10, and the second groove 1021' extends into the protruding portion 1021B. The protruding portion 1021B locally thickens the main board 1021A on one side close to the electrode assembly 10, such that the second welding portion W2 is closer to the second electrode tab 22 in a direction of the winding axis K, which facilitates the direct single connection of the second electrode tab 22 with the end cap body 1021 without the need for an adapter, the structure is simple, and the lead out length of the second electrode tab 22 is reduced. Moreover, in the case of local thickening of the main board 1021A, the second welding portion W2 is maintained at a suitable welding thickness by extending the second groove 1021' into the protruding portion 1021B, and the reliability of the electrical connection is improved.

In the embodiment, the end cap body 1021 is provided with the second groove 1021', the thickness of the end cap body 1021 in the welding area is reduced. After the end cap assembly 102 is mounted on the casing 101, the welding can be directly carried out from the outside of the end cap body 1021, the assembly process is simplified, and the firmness of the welding is improved to reliably achieve the electrical connection between the end cap body 1021 and the second electrode tab 22.

Moreover, for the structure where the first conductive region 112 is located radially on the inner side of the second conductive region 113, the second groove 1021' is radially located in the outside area of the electrode terminal 1022, which provides ample space for arranging the second groove

1021'. When the second conductive region 113 extends circumferentially for a longer length, which is beneficial to improve the electrical connection reliability between the second electrode tab 22 and the end cap body 1021 by increasing the number or circumferential size of the second groove 1021'.

In some embodiments, as shown in FIG. 7, a plurality of second grooves 1021' are provided, and the plurality of second grooves 1021' are spaced along the circumference of the winding body S, and each second groove 1021' extends along the circumference of the winding body S.

For example, two second grooves 1021' are provided, and the two second grooves 1021' are symmetrically arranged relative to the winding axis K. The end cap assembly 102 further includes a liquid injection component and a pressure relief component 1024 located on the end cap body 1021. The liquid injection component is located between the first ends of each of the two second grooves 1021', and the pressure relief component 1024 is located between the second ends of each of the two second grooves 1021'. In the embodiment, the liquid injection component includes a through hole 1021C and a cap body 1023 located on the end cap body 1021. The through hole 1021C is used for injecting electrolyte, the cap body 1023 closes the through hole 1021C after the electrolyte is injected, and the electrolyte is injecting after the cap body 1023 is removed. The pressure relief component 1024 is used to release pressure when the internal pressure of the casing 101 exceeds a preset threshold value.

In the embodiment, a plurality of second grooves 1021' are provided and spaced circumferentially on the end cap body 1021, which not only improves the reliability of the electrical connection between the second electrode tab 22 and the end cap body 1021 (for example, when using welding to achieve electrical connection, a plurality of welding positions can ensure welding strength and prevent the welding positions from loosening when the battery is subjected to vibration and impact during use), but also provides other components such as a liquid injection component and a pressure relief component 1024 between adjacent second grooves 1021', to fully use the space on the end cap body 1021.

Figure 9:
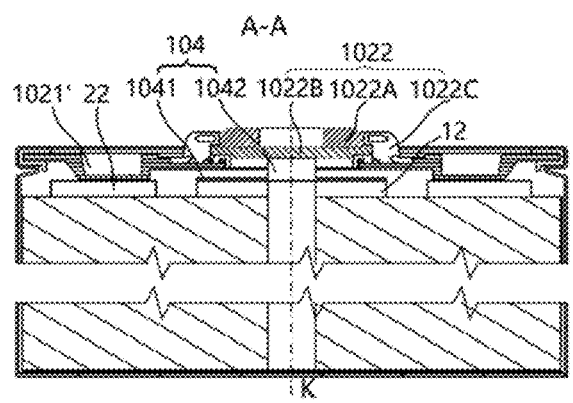
FIG. 9 is a cross-sectional view of a second embodiment of the battery cell along a line A-A shown in FIG. 7.

In some embodiments, as shown in FIG. 9, the battery cell 100 further includes an adapter 104, and the first electrode tab 12 is electrically connected to the electrode terminal 1022 through the adapter 104, and/or the second electrode tab 22 is electrically connected to the end cap body 1021 through the adapter 104. For example, the electrical connection is achieved by welding or riveting.

For example, when using a welding method, the first electrode tab 12 and/or the second electrode tab 22 is first welded to the adapter 104, the electrode terminal 1022 is electrically connected to the adapter 104 from the outside of the end cap assembly 102 and the end cap body 1021 is electrically connected to the adapter 104 after the end cap assembly 102 is mounted.

For example, the adapter 104 includes: a first connecting portion 1041 and a second connecting portion 1042 connected to each other, and the size of the first connecting portion 1041 in the radial direction is greater than that of the second connecting portion 1042. For the adapter 104 connected between the first electrode tab 12 and the electrode terminal 1022, the first connecting portion 1041 is electrically connected to the first electrode tab 12, and the second connecting portion 1042 is electrically connected to the electrode terminal 1022; and/or for the adapter 104 connected between the second electrode tab 22 and the end cap body 1021, the first connecting portion 1041 is electrically connected to the second electrode tab 22, and the second connecting portion 1042 is connected to the end cap body 1021.

For example, the first connecting portion 1041 is in a disc sheet-like structure, which can increase the connection area with the first electrode tab 12 or the second electrode tab 22 to improve connection reliability. It is particularly suitable for a structure where the first electrode tab 12 is wound for at least one cycle, such that the first electrode tab 12 is connected to the first connecting portion 1041 throughout the entire circumference. The second connecting portion 1042 is in a cylindrical structure, and one end of the cylindrical structure is connected to the first connecting portion 1041, for example, connected to the center position of the first connecting portion 1044, while another end is connected to the electrode terminal 1022. Considering that the size of electrode terminal 1022 is smaller, the first electrode tab 12 is electrically connected to the electrode terminal 1022 by the adapter 104 to improve the reliability of electrical energy transmission.

In the embodiment, the size of the first connecting portion 1041 in the radial direction is greater than that of the second connecting portion 1042, such that the first connecting portion 1041 covers more electrode tab layers in the radial direction of the first electrode tab 12 or the second electrode tab 22, the connection length between the first connecting portion 1041 and the first electrode tab 12 or the second electrode tab 22 in the radial direction is increased, and the reliability of the electrical connection is improved. For example, when using welding for electrical connection, the welding trajectory passes through more electrode tab layers, such that the connection between the first connecting portion 1041 and the electrode tabs is more secure. Moreover, the size of the second connecting portion 1042 in the radial direction is reduced, which is adapt to the connection area of the electrode terminal 1022 or the end cap body 1021, therefore adapts to the smaller cross-sectional area of the electrode terminal 1022 and reduces the electrical connection area on the end cap body 1021, so as to leave space for layout of other components.

In the embodiment, the first electrode tab 12 is directly electrically connected to the electrode terminal 1022, and the second electrode tab 22 is directly electrically connected to the end cap body 1021. The first electrode tab 12 and the second electrode tab 22 can determine whether the adapter 104 needs to be provided according to the connection requirements.

In the embodiment, the battery cell 100 includes the adapter 104, the requirements for the positional relationship between the first electrode tab 12 and the electrode terminal 1022, as well as between the second electrode tab 22 and the end cap body 1021, are reduced, thereby the difficulty of the electrical connection process is reduced. Moreover, due to the fluffiness of the plurality of electrode tabs, the connection reliability by the adapter 104 is easier to be improved to increase the overcurrent capacity of the inner and outer ring electrode tabs. For example, when using welding for electrical connection, the welding trajectory between the adapter 104 and the electrode tabs is controllable, which can improve the firmness of welding. In addition, the damage to the electrode tabs or winding body S during electrical connection is further avoided, for example, when welding is used, which can prevent welding energy from burning the electrode tabs, causing deformation of the winding body S, or detachment of the coating layer on the first main portion 11 and second main portion 21.

In some embodiments, the first electrode tab 12 is wound at least one full turn, and/or the second electrode tab 22 is wound at least one full turn.

In the embodiment, the electrode tabs continuously extend and wind for at least one full turn, therefore, the connection strength with the winding body S in a circumferential direction is good, such that the root portions of the electrode tabs have a good self-supporting effect. During the process of applying circumferential force to the electrode tabs to flatten, the wrinkling phenomenon of the electrode tabs is avoided, and the shape of the flattening area is stable. The electrical connection effect between the first electrode tab 12 and the electrode terminal 1022, as well as between the second electrode tab 22 and the end cap body 1021, are optimized, which ensures that the electrode assembly 10 can reliably transmit power to the outside and improve the overcurrent capacity. In addition, particles generated during electrode tabs welding are further less likely to fall between the first electrode sheet 1 and second electrode sheet 2 in the liquid conductive region 111 in a circumferential direction, which can improve the reliability of electrode assembly and prevent short circuits or scratches on the electrode sheets.

In addition, a continuous first electrode tab 12 is arranged on a portion of a winding length of the first main body 11, and a continuous second electrode tab 12 is arranged on a portion of the winding length of the second main body 21, the overcurrent capacity of the first electrode tab 12 and the second electrode tab 22 are met, discrete electrode tabs on the entire winding length of the main bodies are not needed, which simplifies the die-cutting process of the electrode tabs. At the same time, when the first electrode sheet 1 and the second electrode sheet 2 are wound to form the winding body S, there is no need for electrode tabs alignment, which simplifies the process and improve the production efficiency of electrode assembly 10.

In some embodiments, the first electrode tab 12 is wound by a plurality of full turns on the first conductive region 112, and/or the second electrode tab 22 is wound by a plurality of full turns on the second conductive region 113. The first electrode tab 12 or the second electrode tab 22 are wound for at least two full turns. For example, in order to achieve optimal self-supporting effect for the first electrode tab 12 or the second electrode tab 22, at least five winding turns is required, and the number of winding turns is designed based on the overcurrent capacity and polarization of the electrode assembly 10.

In the embodiment, the electrode tabs are wound by a plurality of full turns on the conductive regions, the bending parts of the adjacent two electrode tab layers overlap with each other in the electrode tabs after flattening, the supporting effect of the electrode tabs is further strengthened, which prevents the electrode tabs from flattening and wrinkling, stabilizes the shape of the bending parts, and the welding effect between the first electrode tab 12 and the electrode terminal 1022, as well as the second electrode tab 22 and the end cap body 1021, are optimized. Moreover, the welding area between the flattened electrode tabs and the electrode terminal 1022 or end cap body 1021 is increased, such that the welding between the first electrode tab 12 and the electrode terminal 1022, as well as between the second electrode tab 22 and the end cap body 1021 are more secure, which ensures that the electrode assembly 10 can reliably transmit power to the outside and improve the overcurrent capacity.

Figure 10:
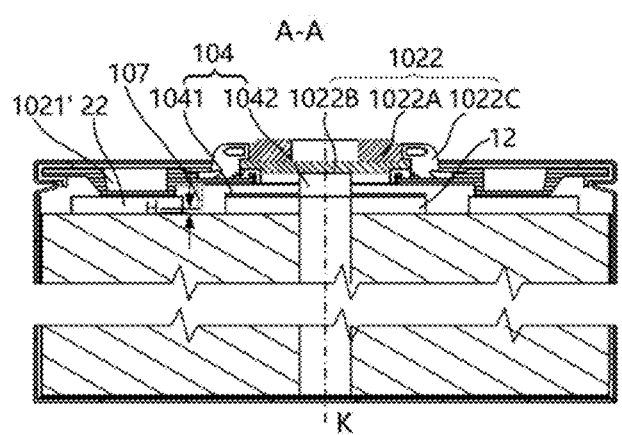
FIG. 10 is a cross-sectional view of a third embodiment of the battery cell along a line A-A shown in FIG. 7.

In some embodiments, as shown in FIG. 10, the battery cell 100 further includes a first insulating member 107, and at least a portion of the first insulating member 107 is located radially along the winding body S between adjacent first conductive regions 112 and the second conductive regions 113.

For example, the cross-section of the first insulating member 107 is in an L-shaped structure, the transverse part of the L-shaped structure is connected to the end cap body 1021 and the vertical part of the L-shaped structure is extended into the area between the first electrode tab 12 and the second electrode tab 22.

In the embodiment, the first electrode tab 12 is isolated from the second electrode tab 22 by the first insulating member 107 to prevent contact short circuits between the first electrode tabs 12 and 22 due to vibration or impact, therefore the operational reliability of the battery cell 100 is improved.

Figure 13:
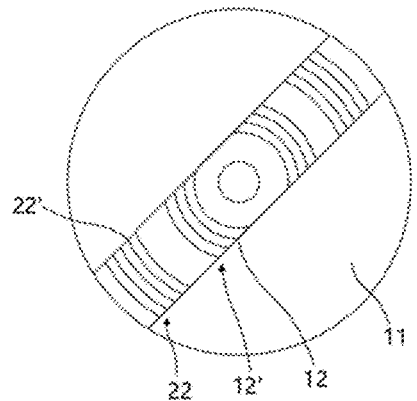
FIG. 13 is a schematic view of an end structure in other embodiments of an electrode assembly.

In some embodiments, as shown in FIG. 13, the first electrode sheet 1 is provided with a plurality of first electrode tabs 12 spaced along the winding direction, and the plurality of first electrode tabs 12 form at least one first electrode tab group 12'; at least one first conductive region 112 is provided, and the first electrode tab group 12' is arranged corresponding to the first conductive region 112, the first electrode tab group 12' is extended circumferentially along a portion of the winding body S and includes the plurality of first electrode tabs 12 laminated radially; and/or, the second electrode sheet 2 is provided with a plurality of second electrode tabs 22 spaced along the winding direction, and the plurality of second electrode tabs 22 form at least one second electrode tab group 22', at least one second conductive region 113 is provided, and the second electrode tab group 22' is arranged corresponding to the second conductive region 113, the second electrode tab group 22' is extended circumferentially along a portion of the winding body S and includes the plurality of second electrode tabs 22 laminated radially.

For example, two first conductive regions 112 are provided, each of which leads out a first electrode tab group 12', and the two first conductive regions 112 are symmetrically arranged relative to the winding axis K. Two second conductive regions 113 is provided, each of which leads out a second electrode tab group 22', and the two second electrode tab groups 22' are symmetrically arranged relative to the winding axis K. The second conductive region 113 is located radially outside the first conductive region 112.

In the embodiment, the width of the plurality of first electrode tabs 12 in the first electrode tab group 12' along the winding direction are the same, and the width of the plurality of second electrode tabs 22 in the second electrode tab group 13' along the winding direction are the same. The electrode tab groups are in a rectangular structure, except that the two radially opposite sides of the rectangular structure are arc-shaped. The same side ends of the plurality of electrode tabs in the electrode tab group are aligned to increase the effective contact area between the electrode tab group and the electrode terminal 1022 or the end cap body 1021 when electrically connected, and improve the overcurrent capacity. This structure equalizes the width of the plurality of electrode tabs in the electrode tab group, the difficulty of die-cutting electrode tabs is reduced, the size of electrode tabs is ensured, and the alignment of the plurality of electrode tabs during winding is ensured, therefore the process difficulty of manufacturing the electrode assembly 10 is reduced.

In an embodiment, the first electrode tab group 12' and the second electrode tab group 22' are in a fan-shaped structure.

In the embodiment, the leading method of the electrode tabs reduce the weight of the electrode assembly 10 while ensure current transmission capacity, therefore the weight of the battery cell 100 is reduced.

FIGS. 3 to 8 are structural schematic views of the first embodiment of the battery cell 100 of the present application. As shown in FIGS. 3 and 4, the battery cell 100 includes a casing 101, an end cap assembly 102, and an electrode assembly 10. The casing 101 is provided with an opening 1011, and the end cap assembly 102 is used to close the opening 101*l*. The end cap assembly 102 includes the end cap body 1021 and an electrode terminal 1022 that is insulated and connected to the end cap body 1021, and the end cap body 1021 is used to close the opening 1011. For example, the battery cell 100 is cylindrical in shape.

The electrode assembly 10 is arranged inside the casing 101, as shown in FIG. 5, the electrode assembly 10 is in a winding structure and includes a winding body S, a first electrode tab 12 and a second electrode tab 22 with opposite polarities. One end of the winding body S is concentrically provided with a ring-shaped liquid guiding region 111, a first conductive region 112, and a second conductive region 113. The liquid guiding region 111 is radially located between the first conductive region 112 and the second conductive region 113. The first electrode tab 12 is led out of the first conductive region 112 and wound at least one full turn, while the second electrode tab 22 is led out of the second conductive region 113 and wound at least one full turn, for example, five full turns are wounded.

As shown in FIG. 6, the first electrode sheet 1 includes a first main portion 11 and a first electrode tab 12 protruding from the first main portion 11, the second electrode sheet 2 includes a second main portion 21 and a second electrode tab 22 protruding from the second main portion 21, and the first electrode sheet 1, the second electrode sheet 2, and the diaphragm 3 are configured to wind around the winding axis K, so that the first main portion 11, the second main portion 21, and the diaphragm 3 are laminated to form the winding body S. The first electrode tab 12 and the second electrode tab 22 are located at the same end of the winding body S along the winding axis, and the first electrode tab 12 and the second electrode tab 22 are respectively located at the inner and outer ends along the winding direction. The diaphragm 3 extends beyond the first main portion 11 and the second main portion 21 on at least one side of the liquid guide region 111.

As shown in FIGS. 7 and 8, the first electrode tab 12 is electrically connected to the electrode terminal 1022, and the central line of the electrode terminal 1022 coincides with the winding axis K, while the second electrode tab 22 is electrically connected to the end cap body 1021.

The electrode terminal 1022 is designed as a composite electrode terminal, which includes a first terminal portion 1022A, a second terminal portion 1022B, and a second insulating member 1022C. The first terminal portion 1022A and the second terminal portion 1022B are connected along the direction of the winding axis K. The second terminal portion 1022B is located between the first terminal portion 1022A and the electrode assembly 10, and the second insulating member 1022C is sheathed outside the first terminal portion 1022A and the second terminal portion 1022B.

For example, the electrode terminal 1022 is a negative terminal, and the first terminal portion 1022A is made of aluminum material and used for connecting to the external circuit of the battery cell 100; the second terminal portion 1022B is made of copper material and is designed as a disc-shaped structure. The second terminal portion 1022B is directly electrically connected to the first electrode tab 12, for example, by welding or other methods. A through hole extending along the winding axis K is provided on the first terminal portion 1022A to form a first groove 1022' on the surface of the electrode terminal 1022 away from the electrode assembly 10, and the corresponding part of the second terminal portion 1022B to the through hole is acted as the first welding portion W1 to be welded with the first electrode tab 12.

In the embodiment, a second groove 1021' is arranged on the surface of the end cap body 1021 away from the electrode assembly 10, and the second groove 1021' is recessed towards the direction close to the electrode assembly 10. A second welding portion W2 is formed between the bottom surface of the second groove 1021' and the surface of the end cap body 1021 close to the electrode assembly 10, and the second electrode tab 22 is welded to the second welding portion W2. The end cap body 1021 includes a main board 1021A and a protruding portion 1021B, the protruding portion 1021B is connected to the side of the main board 1021A close to the electrode assembly 10, and the second groove 1021' extends into the protruding portion 1021B. The protruding portion 1021B protrudes out to be engaged with the second electrode tab group 13, and the second welding portion W2 is directly welded with the second electrode tab 22 by the second groove 1021', which does not need for an adapter 104.

Due that a distance between the electrode terminal 1022 and an end face of the winding body S is greater than a distance between the protruding portion 10218 and the end face of the winding body S, therefore, the extension length of the first electrode tab 12 is greater than the extension length of the second electrode tab 22.

The casing 101 is provided with a recessed portion 1012, and the recessed portion 1012 is concavely recessed inward relative to the outer wall of the casing 11 in a circumferential direction. The casing 101 forms a bending part 1013 at one end of the recessed portion 1012 close to the opening 1011, the bending part 1013 is provided with a receiving cavity, and the radial outer end of the end cap body 1021 is embedded into the receiving cavity. The battery cell 100 further includes a sealing member 109, the sealing member 109 is located between the bending part 1013 and the end cap body 1021.

In the embodiment, the recessed portion 1012 extends along the entire circumference of the casing 101, or a plurality of recessed portions 1012 are spaced along a circumferential direction of the casing 101. The sealing member 109 is a sealing ring, and a cross-sectional area of the sealing ring is in a C-shaped structure. The sealing ring is sleeved at the outer end of the end cap body 1021 to insulate the end cap body 1021 from the casing 101. In the embodiment, one end of the C-shaped structure close to the electrode assembly 10 is provided with an extension portion, and the extension portion extends in a direction towards the electrode assembly 10 to insulate the recessed portion 1012 from the internal structure of the battery cell 10. For example, the sealing member 109 is made of materials such as a rubber.

In the embodiment, when the end cap assembly 102 is fixed, the sealing member 109 is first sleeved at the radial outer end of the end cap assembly 102, and the end cap assembly 102 is placed into the casing 101 through the opening 1011. The end cap assembly 102 is pressed against the recessed portion 1012, and then the casing 101 is bent at an end of the recessed portion 1012 close to the opening 1011 to form the bending part 1013, and the bending part 1013 is wrapped outside the sealing member 109. The end cap assembly 102 and the casing 101 are fixed by using a upsetting seal method, and the insulation between the end cap body 1021 and the casing 101 is achieved by providing the sealing member 109. In this way, when the end cap body 1021 is used as the electrode terminal, the casing 101 is uncharged, and the safety of the operation the battery cell 100 is improved.

FIG. 9 is a schematic view of the second embodiment of the battery cell 100 of the present application. The difference from the first embodiment shown in FIG. 8 is that the lead out lengths of the first electrode tab 12 and the second electrode tab 22 are the same, and the first electrode tab 12 is electrically connected to the electrode terminal 1022 by the adapter 104. The adapter 104 includes a first connecting portion 1041 and a second connecting portion 1042 connected with each other, and the size of the first connecting portion 1041 in the radial direction is greater than that of the second connecting portion 1042. For the adapter 104 connected between the first electrode tab 12 and the electrode terminal 1022, the first connecting portion 1041 is electrically connected to the first electrode tab 12, and the second connecting portion 1042 is electrically connected to the electrode terminal 1022.

FIG. 10 is a schematic view of the third embodiment of the battery cell 100 of the present application. The difference from the second embodiment shown in FIG. 9 is that the battery cell 100 further includes a first insulating member 107, at least a portion of the first insulating member 107 is radially arranged between the adjacent first conductive region 112 and the second conductive region 113 along the winding body S, and a preset distance H is provided between the first insulating member 107 and the end face of the winding body S. For example, the cross-section of the first insulating member 107 is in an L-shaped structure, and the transverse part of the L-shaped structure is connected to the end cap body 1021, the vertical part extends into the area between the first electrode tab 12 and the second electrode tab 22, and a preset distance H is provided between the vertical part and the end face of the winding body S.

Figure 11:
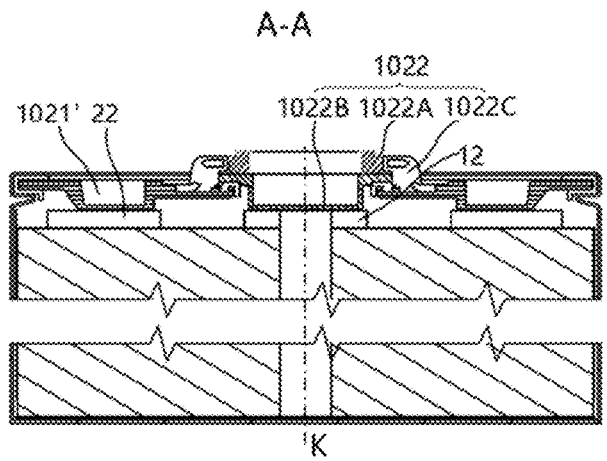
FIG. 11 is a cross-sectional view of a fourth embodiment of the battery cell along a line A-A shown in FIG. 7.

FIG. 11 is a schematic view of the fourth embodiment of the battery cell 100 of the present application. The difference from the first embodiment shown in FIG. 8 is that the second terminal portion 1022B is designed so that the local area of the plate-shaped structure protrudes towards the electrode assembly 10 to be connected to the first electrode tab 12, so as to eliminate the arrangement of the adapter 104.

Figure 12:
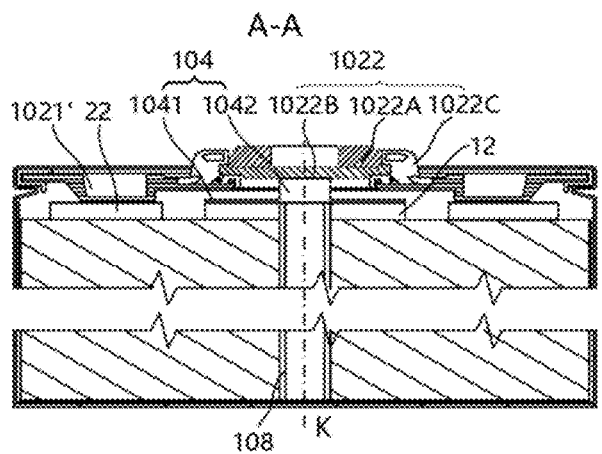
FIG. 12 is a cross-sectional view of a fifth embodiment of the battery cell along a line A-A shown in FIG. 7.

FIG. 12 is a schematic view of the fifth embodiment of the battery cell 100 of the present application. The difference from the second embodiment shown in FIG. 9 is that a hollow area of the winding body S located in the winding center is provided with a central tube 108. One end of the central tube 108 is flush with the first electrode tab 12, so that when the adapter 104 is welded to the first electrode tab 12, the supporting force is provided by the central tube 108.

Figure 14:
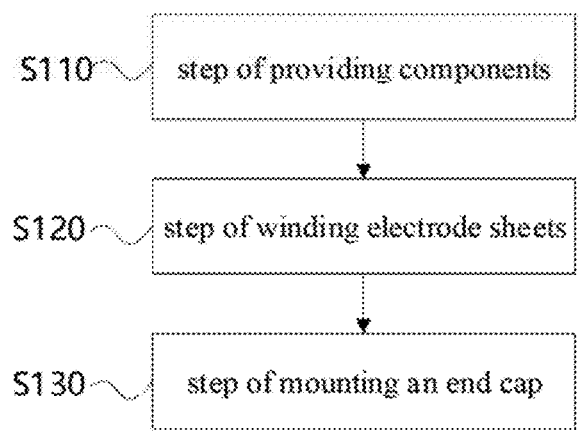
FIG. 14 is a flowchart of a method for manufacturing a battery cell in some embodiments of the present application.

The present application further provides a method for manufacturing the battery cell 100. In some embodiments, as shown in FIG. 14, the manufacturing method includes:

S110, a step of providing components: providing a casing 101, an end cap assembly 102, and a first electrode sheet 1 and a second electrode sheet 2 with opposite polarities; the casing 101 is provided with an opening 1011, the end cap assembly 102 includes an end cap body 1021 and an electrode terminal 1022 located on the end cap body 1022, the first electrode sheet 1 includes a first main portion 11 and a first electrode tab 12 protruding from the first main portion 11, and the second electrode sheet 2 includes a second main portion 21 and a second electrode tab 22 protruding from the second main portion 21;

S120, a step of winding electrode sheets: winding the first electrode sheet 1 and the second electrode sheet 2 around a winding axis K to overlap the first main portion 11 and the second main portion 21 and form a winding body S, an end of the winding body S includes a first conductive region 112 and a second conductive region 113; leading out the first electrode tab 12 from the first conductive region 112, and leading out the second electrode tab 22 from the second conductive region 113, and adjacent first conductive region 112 and second conductive region 113 are arranged to be spaced along a radial direction of the winding body S; and S130, a step of mounting an end cap: closing the opening 1011 of the end cap assembly 102, electrically connecting the first electrode tab 12 to the electrode terminal 1022, and electrically connecting the second electrode tab 22 to the end cap body 1021.

In the embodiment, the steps S110-S130 are executed sequentially.

In the embodiment, the first electrode tab 12 and the second electrode tab 22 are led out from a same end of the winding body S, therefore, only one end of the electrode assembly 10 needs to reserve electrical connection space, which eliminates the need to provide electrode terminals 1022 at both ends of the battery cell 100, the overall energy density of the battery cell 100 is effectively improved. When the capacity of the battery cell 100 is constant, the volume of the battery cell 100 is reduced, such that the layout of the battery 200 in the electrical device is easier.

Moreover, the battery cell 100 is only provided with one electrode terminal 1022, which can simplify the structure and assembly process of the battery cell 100. By eliminating one electrode terminal, a larger space is left on the end cap body 1021, the layout of the liquid injection and pressure relief components on the end cap body 1021 is easier. Further, by eliminating one electrode terminal, the ample space for arranging temperature collection components, junction components between battery cells 100, and various types of wires is left, which further beneficial to increase the cross-sectional area of the electrode terminal 1022 and increase the overcurrent capacity of the battery cell 100.

In addition, the first electrode tab 12 and the second electrode tab 22 are radially arranged and spaced apart, which is beneficial for increasing the extension size of the first electrode tab 12 and the second electrode tab 22 along the circumference of the winding body S, and improving the connection strength between the electrode tabs and the winding body, such that the root portions of the electrode tabs have a good self-supporting effect. During the process of applying circumferential force to the electrode tabs to flatten, the wrinkling phenomenon of the electrode tabs is reduced, and the shape of the flattening area is stable. The electrical connection effect between the first electrode tab 12 and the electrode terminal 1022, as well as between the second electrode tab 22 and the end cap body 1021, are optimized, which ensures that the electrode assembly 10 can reliably transmit power to the outside and improve the overcurrent capacity.

Figure 15:
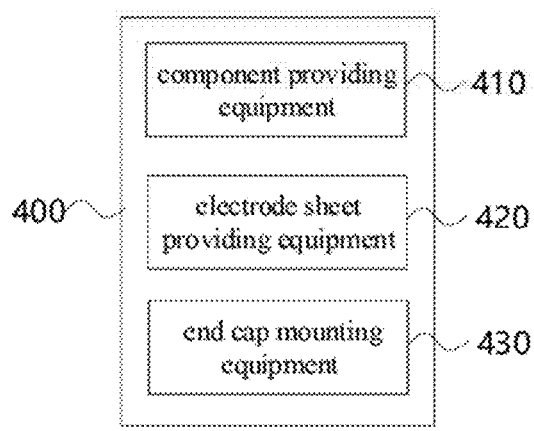
FIG. 15 is a schematic view of a module assembly of a device for manufacturing a battery cell in some embodiments of the present application.

The present application further provides a device 400 for manufacturing the battery cell 100. In some embodiments, as shown in FIG. 15, the manufacturing device 400 includes: a component providing equipment 410, an electrode sheet winding equipment 420, and an end cap mounting equipment 430.

The component providing equipment 410 is configured for providing a casing 101, an end cap assembly 102, and a first electrode sheet 1 and a second electrode sheet 2 with opposite polarities; the casing 101 is provided with an opening 1011, the end cap assembly 102 includes an end cap body 1021 and an electrode terminal 1022 located on the end cap body 1022, the first electrode sheet 1 includes a first main portion 11 and a first electrode tab 12 protruding from the first main portion 11, and the second electrode sheet 2 includes a second main portion 21 and a second electrode tab 22 protruding from the second main portion 21.

The electrode sheet winding equipment 420 is configured for winding the first electrode sheet 1 and the second electrode sheet 2 around a winding axis K to overlap the first main portion 11 and the second main portion 21 and form a winding body S, an end of the winding body S includes a first conductive region 112 and a second conductive region 113; leading out the first electrode tab 12 from the first conductive region 112, and leading out the second electrode tab 22 from the second conductive region 113, and adjacent first conductive region 112 and second conductive region 113 are arranged to be spaced along a radial direction of the winding body S.

The end cap mounting equipment 430 is configured for closing the opening 1011 of the end cap assembly 102, electrically connecting the first electrode tab 12 to the electrode terminal 1022, and electrically connecting the second electrode tab 22 to the end cap body 1021.

Although the present application has been described with reference to the embodiments, various improvements can be made and components can be replaced with equivalents without departing from the protection scope of the present application. The various technical features mentioned in each embodiment can be combined in any way in case that there is no structural conflict. The present application is not limited to the specific embodiments applied in the specification, but includes all technical solutions falling within the scope of the claims.

What is claimed is:

1. A battery cell, comprising:
   a casing, provided with an opening;
   an end cap assembly, configured to close the opening, wherein the end cap assembly comprises an end cap body and an electrode terminal located on the end cap body; and
   an electrode assembly, arranged in the casing and comprising a first electrode sheet and a second electrode sheet with opposite polarities;
   wherein
   the first electrode sheet comprises a first main portion and a first electrode tab protruding from the first main portion, and the second electrode sheet comprises a second main portion and a second electrode tab protruding from the second main portion;
   the first electrode sheet and the second electrode sheet are configured to be wound around a winding axis, such that the first main portion and the second main portion are laminated to form a winding body;
   an end of the winding body comprises a first conductive region and a second conductive region, the first electrode tab is led out from the first conductive region, the second electrode tab is led out from the second conductive region, and adjacent first conductive region and second conductive region are arranged to be spaced along a radial direction of the winding body; and
   wherein the first electrode tab is electrically connected to the electrode terminal, and the second electrode tab is electrically connected to the end cap body.

2. The battery cell according to claim 1, wherein the first conductive region is located radially inside the second conductive region.

3. The battery cell according to claim 1, wherein
   the electrode terminal is provided with a first groove on a surface away from the electrode assembly, the first groove is recessed towards a direction close to the electrode assembly; and
   a first welding portion is formed between a bottom surface of the first groove and a surface of the electrode terminal close to the electrode assembly, and the first electrode tab is welded to the first welding portion.

4. The battery cell according to claim 1, wherein
   the end cap body is provided with a second groove on a surface away from the electrode assembly, and the second groove is recessed towards a direction close to the electrode assembly; and
   a second welding portion is formed between a bottom surface of the second groove and a surface of the end cap body close to the electrode assembly, and the second electrode tab is welded to the second welding portion.

5. The battery cell according to claim 4, wherein a plurality of second grooves are provided, and the plurality of second grooves are arranged to be spaced along a circumferential direction of the winding body.

6. The battery cell according to claim 1, further comprising an adapter, wherein
   the first electrode tab is electrically connected to the electrode terminal by the adapter, and/or
   the second electrode tab is electrically connected to the end cap body by the adapter.

7. The battery cell according to claim 1, wherein the first electrode tab is wound at least one full turn, and/or the second electrode tab is wound at least one full turn.

8. The battery cell according to claim 1, wherein
   the first electrode tab is wound by a plurality of full turns on the first conductive region, and/or
   the second electrode tab is wound by a plurality of full turns on the second conductive region.

9. The battery cell according to claim 1, wherein
   the first electrode sheet is provided with a plurality of first electrode tabs spaced along a winding direction, and the plurality of first electrode tabs form at least one first electrode tab group;
   at least one first conductive region is provided, and the first electrode tab group is arranged corresponding to the first conductive region, the first electrode tab group is extended circumferentially along a portion of the winding body and comprises the plurality of first electrode tabs laminated radially; and/or
   the second electrode sheet is provided with a plurality of second electrode tabs spaced along the winding direction, and the plurality of second electrode tabs form at least one second electrode tab group, at least one second conductive region is provided, and the second electrode tab group is arranged corresponding to the second conductive region, the second electrode tab group is extended circumferentially along a portion of the winding body and comprises the plurality of second electrode tabs laminated radially.

10. The battery cell according to claim 1, wherein
    an end of the winding body further comprises at least one liquid guiding region;

the liquid guiding region is located radially along the winding body between the adjacent first conductive region and second conductive region; and the liquid guiding region is configured to guide an electrolyte to flow into an interior of the winding body.

11. The battery cell according to claim 10, wherein a plurality of liquid guiding regions are provided, the end of the winding body is provided with a plurality of first conductive regions arranged to be spaced along a radial direction of the winding body, and a liquid guiding region is arranged between adjacent first conductive regions; and/or the end of the winding body is provided with a plurality of second conductive regions arranged to be spaced along a radial direction of the winding body, and a liquid guiding region is arranged between adjacent second conductive regions.

12. The battery cell according to claim 10, wherein the electrode assembly further comprises a diaphragm configured for separating the first electrode sheet from the second electrode sheet, the diaphragm, the first main portion, and the second main portion are wound to form the winding body; and a portion of the diaphragm located in the liquid guiding region extends beyond sides of the first main portion and the second main portion in an extension direction of the winding axis.

13. The battery cell according to claim 1, further comprising a first insulating member, wherein at least a portion of the first insulating member is radially arranged between adjacent first conductive region and second conductive region along the winding body.

14. A battery, comprising:

the battery cell according to claim 1; and a box body, configured for accommodating the battery cell.

15. An electrical device, comprising the battery according to claim 14, wherein the battery is configured for supplying electrical energy to the electrical device.

16. A method for manufacturing a battery cell, comprising:

a step of providing components comprising: providing a casing, an end cap assembly, and a first electrode sheet and a second electrode sheet with opposite polarities; wherein the casing is provided with an opening, the end cap assembly comprises an end cap body and an electrode terminal located on the end cap body, the first electrode sheet comprises a first main portion and a first electrode tab protruding from the first main portion, and the second electrode sheet comprises a second main portion and a second electrode tab protruding from the second main portion;

a step of winding electrode sheets comprising: winding the first electrode sheet and the second electrode sheet around a winding axis to overlap the first main portion and the second main portion and form a winding body, wherein an end of the winding body comprises a first conductive region and a second conductive region; leading out the first electrode tab from the first conductive region, and leading out the second electrode tab from the second conductive region, wherein adjacent first conductive region and second conductive region are arranged to be spaced along a radial direction of the winding body; and a step of mounting an end cap comprising: closing the opening of the end cap assembly, electrically connecting the first electrode tab to the electrode terminal, and electrically connecting the second electrode tab to the end cap body.

17. A device for manufacturing a battery cell, comprising:

a component providing apparatus, configured to provide a casing, an end cap assembly, and a first electrode sheet and a second electrode sheet with opposite polarities; wherein the casing is provided with an opening, the end cap assembly comprises an end cap body and an electrode terminal located on the end cap body, the first electrode sheet comprises a first main portion and a first electrode tab protruding from the first main portion, and the second electrode sheet comprises a second main portion and a second electrode tab protruding from the second main portion;

an electrode sheet providing apparatus, configured to wind the first electrode sheet and the second electrode sheet around a winding axis to overlap the first main portion and the second main portion and form a winding body, wherein an end of the winding body comprises a first conductive region and a second conductive region; leading out the first electrode tab from the first conductive region, and leading out the second electrode tab from the second conductive region, wherein adjacent first conductive region and second conductive region are arranged to be spaced along a radial direction of the winding body; and an end cap mounting apparatus, configured to close the opening of the end cap assembly, electrically connect the first electrode tab to the electrode terminal, and electrically connect the second electrode tab to the end cap body.

* * * * *